Oct. 3, 1961 T. K. PETERSEN ET AL Re. 25,045

AIR CUSHION CARGO HANDLING SYSTEM

Original Filed June 11, 1958 2 Sheets-Sheet 1

INVENTORS
THORVALD K. PETERSEN
AND PAUL L. SMITH
BY Edwin Coates
ATTORNEY

AIR CUSHION CARGO HANDLING SYSTEM

Original Filed June 11, 1958 2 Sheets-Sheet 2

INVENTORS
THORVALD K. PETERSEN
AND PAUL L. SMITH
BY Edwin Coates
ATTORNEY

United States Patent Office

Re. 25,045
Reissued Oct. 3, 1961

25,045

AIR CUSHION CARGO HANDLING SYSTEM

Thorvald K. Petersen and Paul L. Smith, Santa Monica, Calif., assignors to Douglas Aircraft Company, Inc., Santa Monica, Calif.

Original No. 2,918,183, dated Dec. 22, 1959, Ser. No. 741,399, June 11, 1958. Application for reissue Sept. 21, 1960, Ser. No. 58,589
12 Claims. (Cl. 214—1)

Matter enclosed in heavy brackets [ ] appears in the original patent but forms no part of this reissue specification; matter printed in italics indicates the additions made by reissue.

This invention relates to article-handling, as in loading cargo into a conveyance or in shifting and stowing articles on a floor.

Most of the effort expended in moving such articles under such circumstances is the result of overcoming the frictional drag or resistance exerted between the bottom face of the article and the supporting floor. The conventional pallet ameliorates this situation somewhat but the concepts and means of subject invention facilitate this moving and reduce the aforesaid effort still more.

Generally considered, it does so by providing between the bottommost face of the container-and-pallet unit, or, if desired directly between the lowermost face of the container and the supporting or stowage floor, first a layer or lamina of constantly-flowed air which moves coextensively with the bottom of the container unit and may be adequately pressurized and serves, primarily, as a lubricant film for quite materially reducing the frictional drag of the cargo-unit on the floor. Means are also provided for achieving this end despite such irregularities in the floor as would otherwise reduce the contact of the cargo-unit with the floor to a series of ridges, lines or points which would not only allow the lubricant film to escape but would be likely to cause jamming, binding or the like of the cargo-unit on the floor. One form of means for accomplishing this result resides in a novel resiliently yielding lowermost floor group or laminate on the pallet or, in a special case, on the bottom of the container itself. In either case, this laminate comprises a substantially rigid floor-sheet constituting the bottom of the container, a lowermost layer of smooth flexible, "conformable" material, such as a smooth "slick" plywood or linoleum, and an intermediate layer of a foamed plastic, such as a foamed rubber, polyurethane, or the like. The maximum load per square foot is restricted to that which will not exceed the limit of compressibility of the foamed plastic and "deaerate" it. In some cases, sponge type material is satisfactory. However, in shifting the cargo-unit over tessellated or ribbed cement floors, some escape of air is unavoidable at one or two loci of the unit, but due to the conventionally wide spacing of these cracks, and to the automatic conforming of the novel lower surface of the new cargo unit to shallow depressions or concavities in the carrying floor, the remainder of the unit will be properly engaged and aided in its translation by the remaining lubricating air layer. Further means are also provided at each end-edge of the cargo-unit that, like the upturned toe of a ski, rides over minor obstructions in the path of the cargo unit.

Solely in order to render the inventive concepts more concrete as well as to detail the mode and principle of embodiment thereof, several ones of the now-contemplated embodiments of the invention are illustrated, by way of example only, in the accompanying drawings and will be described hereinafter in conjunction with these drawings.

In these drawings,

FIG. 1 is a perspective view of the rear end of a conveyance provided with a construction according to the present invention by means of which articles supported according to the invention are being stowed therein with the aid of a more or less conventional loading ramp, "skid," or the like;

Figure 1:
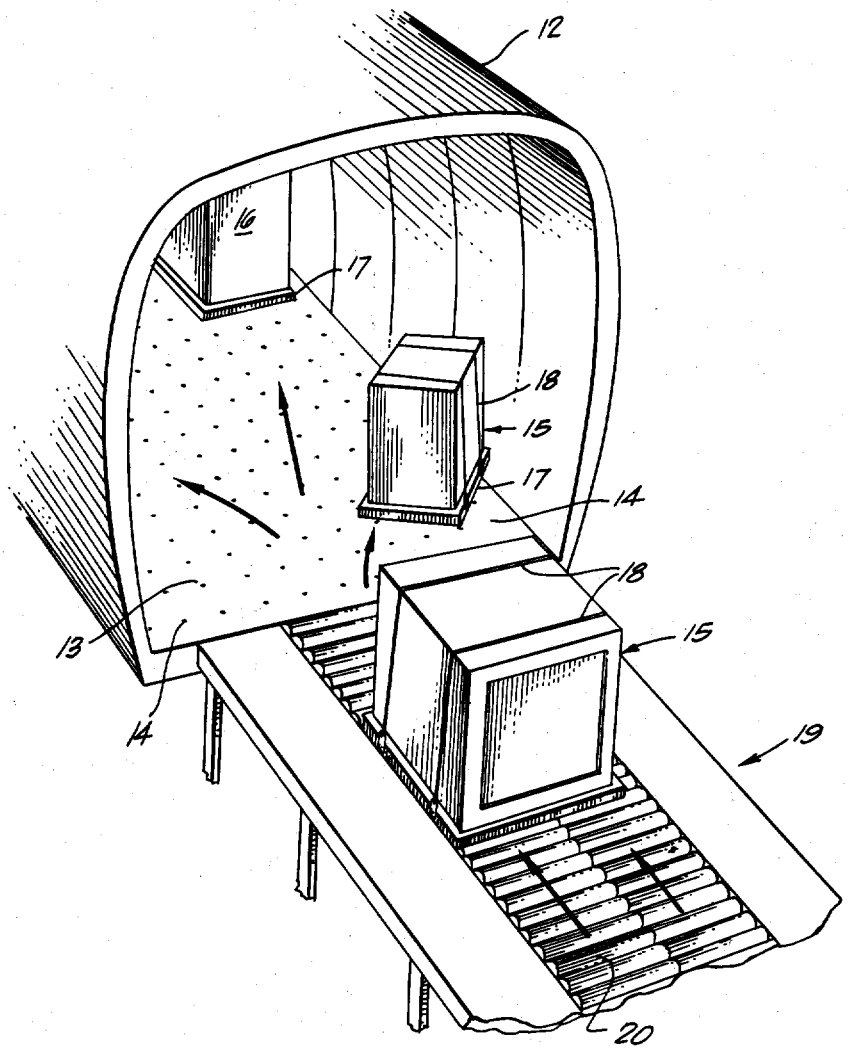

The present concepts are, for illustrative purposes, shown in FIGURE 1 as embodied in the stowage of cargo-units in a conveyance such as a cargo airplane's fuselage, a van, or other vehicle.

The vehicle 12 includes a species of floor 13 which, at equidistant intervals both longitudinally and laterally thereof, includes a plurality of controlled air-inlet ports each provided with air-flow controlling means 14. Means 14 are supplied with low-pressure air, and are interconnected by a manifolding system illustrated in FIGURE 2 at 27. The cargo-units 15 here comprise a container or containers *16* lashed down to novel pallets 17 by such tie-down tensile units as those at 18.

In the orthodox manner, a loading ramp, "skid," or tail gate 19 supplied with the usual forwarding rollers 20, is provided with the rear end of the ramp resting on the datum level-floor or ground, and the forward end thereof abutting the rearmost edge of the floor of the conveyance.

Figure 2:
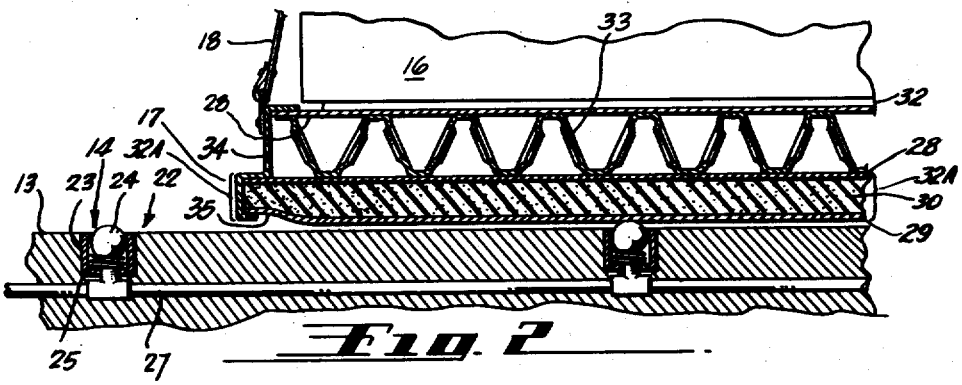
FIG. 2 is a fragmentary longitudinal section of a species of the improved floor of the conveyance and of a portion of the improved pallet and load carried thereby.

The controlled air-inlet ports, as shown in FIGURE 2, consist of one-way, or check, valves, each of which includes a cylindric casing 23 perforate at each opposite axial end and shaped at its upper end to seat a spherical or ball-obturator 24. The ball is spring urged to a normally closed position by a compression spring 25 and each lower perforation communicates with the pressure air manifold system 27. Each ball protrudes above the floor level a distance such that when the ball is urged downwardly into flush relation to the floor, the valve is opened.

As shown in FIGURE 2 the novel pallet, while having the usual rigid wood or metal uppermost surface 32 otherwise differs materially from the conventional pallet. For one reason, the lowermost "face group," 32A which is spaced from the uppermost by trusswork 33, as shown, comprises a laminated structure. This structure includes a rigid wooden or metal layer 28, a lowermost layer 29 which is of special smooth, flexible nature such as that provided by thin plywood or linoleum and is adapted to yieldingly conform to rugosities in the floor of the vehicle; and an intermediate layer 30 of some such resiliently-compressible material as foamed rubber, foamed polyurethane, or the like. Be it what it may, this layer 30 is to compress, not so much by densification of its own material as by compression of the air trapped in the pockets of the foamed material, for reasons later becoming apparent. Further, the unit-load on it is precalibrated not to exceed the limit of compressibility of this "aerosol" and not to cause reduction of the layer to solid condition. If layer 30 were completely solidified by the load, then it could not yield locally to any irregularities in the surface. Hence layer 29 would fail to follow the surface and considerable air would be lost.

While foamed material has many advantages for this use, it has been found that sponge type material is quite satisfactory in many installations.

It will be noted that when layers 32, 32A and 33 are attached together they constitute in effect a single very rigid layer to take the direct burden of the loads placed on the pallet.

The pallet includes a metallic framing 34 encompassing same, and conferring on the pallet the nature of a unitary panel. The periphery of the pallet is, as shown at 35, curved upwardly, much in the manner of a ski's toe portion, thereby to enable the pallet to over-ride minor obstructions during the movement of the cargo-unit.

Figure 3:
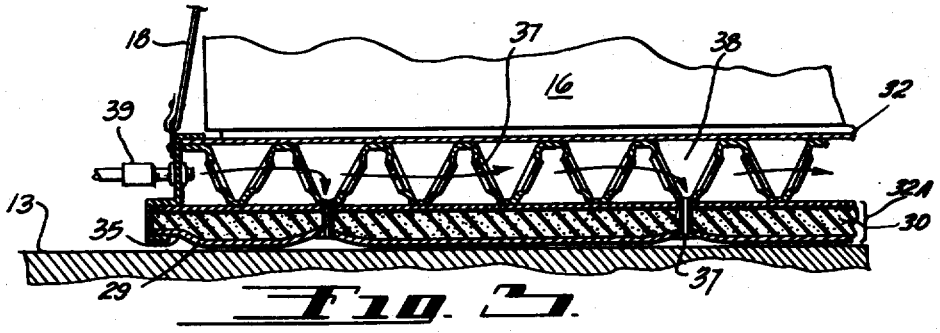
FIG. 3 is a similar view of another species of the invention that includes a variant floor and pallet.

A further species of the invention is shown in FIGURE 3. One of the outstanding variances therein over the one previously described is that the pressurized air is supplied entirely to the pallet itself and is distributed between the pallet and the carrying floor by means of open ports 37 passing thru the laminated bottom-group *32A* of the pallet from the trusswork space 38 that separates the rigid upper surface 32 from the bottom-laminate. An air supply coupling 39, preferably of the quick-disconnect type, entrains the air into space 38.

Figure 4:
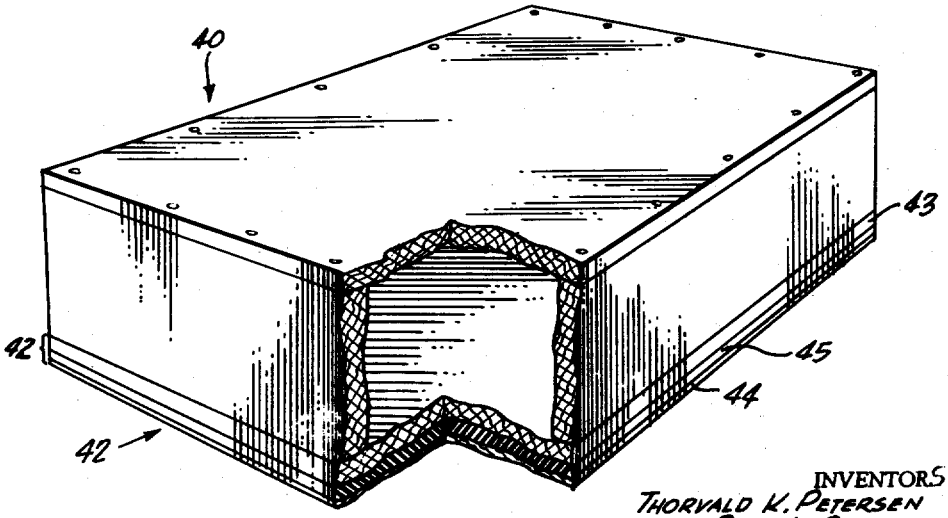
FIGURE 4 is a fragmentary perspective view of a reusable container capable of use directly with the type of transport floor shown in FIGURE 1 without the intermediancy of a pallet.

In FIGURE 4 the re-usable cargo container or tote-box 40 is so constructed as to obviate the necessity for a separate pallet in its use with the floor of FIGURE 1, yet is nonetheless capable of performing substantially all the functions of the aforedescribed species. To these, and other, ends, it comprises, in addition to the usual rectangular side-framing and flat top, a laminated bottom or floor 42 integral with the remainder of the box. The innermost lamina 43 consists of a rather thick, rigid wooden flooring, the lowermost lamina 44 consists of a sheet of the same, or equivalent, smooth flexible material aforedescribed, such as linoleum, as and for the purpose described, and the intermediate lamina consists of the same sort of resiliently yieldable material, such as foamed polyurethane or foamed rubber, or sponge rubber as is hereinabove described.

In use, the species of FIGURES 1 and 2 is urged readily along the cargo floor with flexible lamina 29 directly contacting a plurality of the ball-valves, urging them downwardly sufficiently (1) to clear the floor of their protuberant condition and (2) to release air underneath the travelling container that, in a sense serves as a lubricant layer for the whole bottom area of the pallet, in that it quite materially reduces the "moving" coefficient of friction, from about 0.500 down to 0.001. The manual effort required to load or place the cargo is obviously thereby considerably reduced, as is the elapsed time for stowage. The air layer is not relied upon primarily for "lift," or sustentation of the containers so as to reduce their gravitational effect or weight, but does play some part in facilitating their movement. The linoleum, or other, flexible layer is cushioned resiliently by the foamed material, which functions by virtue of the air-spring of the trapped air in the foam-pockets, thus rendering it even more resilient than the rubber or polyurethane itself. The bottommost layer 29 is abrasion resistant as well as flexible and the entire lower group of the pallet can conform to, and ease out of, slight depresisons in the van's floor. The latter, incidentally, is assumed to be planar, rigid and as free of irregularities as is feasible for the expense involved in so rendering it. If the device is moved over cement floors having expansion joints or cracks therein, some air may escape laterally, but the remaining air-layer will be adequate for present purposes. The plywood or linoleum layer can "dip" into slight but broad depressions and conform thereto, whereafter it will regain its original shape.

The species of FIGURE 3 performs substantially the same functions as that of FIGURE 2, with the possible advantage that there are no chances of ball-valves jamming in their protruding original positions and obstructing the passage of the cargo-unit.

The species of FIGURE 4 incorporates the advantage of reusability plus eradication of discrete pallets.

The air pressure can vary from about 1 p.s.i. to 5 p.s.i.

Although certain parameters and specific terminology have been hereinabove employed, such constitutes no limitations on the scope of the invention per se, which scope is defined in the sub-joined claims.

We claim:

1. Cargo handling apparatus comprising: a main support adapted to have cargo placed thereon; a lower lamina of sheet-like generally planar flexible material affixed to said main support and being adapted to directly contact a surface across which the cargo is to be moved; an intermediate lamina of multicellular material rendered resiliently compressible and dimensionally-recuperative by air trapped in the cells, said material lying immediately adjacent said lower laminate and being interposed between said main support and lower lamina, said intermediate lamina being adapted to locally expand and be compressed upon flexure of the lower lamina when the latter contacts local irregularities in said surface whereby the lower lamina will have substantially full contact with said surface; and multi outlet means supplying a flow of a pressurized gaseous medium between the lower lamina and the surface, said multi outlet means being oriented to effect the presence of a film flow of the gaseous fluid across substantially the entire area of the lower lamina whereby the coefficient of friction between the lower lamina and the surface is substantially reduced and the lateral force required to move the cargo is proportionately reduced.

2. Cargo handling apparatus comprising: a main support adapted to have cargo placed thereon; a lower lamina of sheet-like generally planar flexible material affixed to said main support and being adapted to directly contact and slide upon a generally planar surface across which the cargo is to be moved; an intermediate lamina of resiliently compressible material immediately adjacent said lower laminate and being interposed between said main support and lower lamina, said intermediate lamina being adapted to locally expand and be compressed upon flexure of the lower lamina when the latter contacts local irregularities in said surface whereby the lower lamina will have substantially full contact with said surface; a plurality of outlets in said apparatus and extending through the intermediate and lower laminae and supplying a flow of a pressurized gaseous medium between the lower lamina and the surface, said multi outlet means being oriented to effect the distribution of a flow of the gaseous fluid across substantially the entire area of the lower lamina whereby the coefficient of friction between the lower lamina and the surface is substantially reduced and the lateral force required to move the cargo is proportionately reduced.

3. Cargo handling apparatus comprising: a main support adapted to have cargo placed thereon; a lower lamina of sheet-like generally planar flexible material affixed *to* said main support, at least a portion of the periphery of said lamina being curved upwardly; an intermediate lamina of resiliently compressible material immediately adjacent said lower lamina and being interposed between said main support and lower lamina; a floor-like structure having a generally planar surface across which the main support is moved with the lower lamina in face to face contact with said surface, said intermediate lamina being adapted to locally expand and be compressed upon flexure of the lower lamina when the latter contacts local irregularities in said surface; a plurality of outlets spaced generally uniformly in the surface of said floor-like structure; a source of pressurized gas communicating with said outlets; valve means normally closing said outlets; and operating means for opening said valves, said operating means protruding above the surface of the floor-like structure and being depressible by said lower lamina whereby to effect opening of the valves and a distribution of the pressurized gas between the surface and the lower lamina.

4. Cargo handling apparatus comprising: a main support adapted to have cargo placed thereon; a lower lamina of sheet-like generally planar flexible material affixed *to* said main support and being adapted to directly contact a surface across which the cargo is to be moved; an intermediate lamina of resiliently compressible material immediately adjacent said lower lamina and being interposed between said main support and lower lamina, said intermediate lamina being adapted to locally expand and be compressed upon flexure of the lower lamina when the latter contacts local irregularities in said surface whereby the lower lamina will have substantially full contact with said surface; multi outlet means supplying a flow of a pressurized gaseous medium between the lower lamina and the surface, said multi outlet means being in and at the lower lamina and being oriented to effect the presence of a film flow of the gaseous fluid across substantially the entire area of the lower lamina whereby the coefficient of friction between the lower lamina and the surface is substantially reduced and the lateral force required to move the cargo is proportionately reduced; and a gaseous fluid distribution system in said apparatus connected to each of said multi outlet means; and a quick detachable connection to said distribution system for communicating with a source of gaseous fluid.

5. Cargo handling apparatus adapted to be moved across a floor-like structure on a film of constantly flowing pressurized gaseous medium, comprising: a laminated construction including an upper main support of rigid material adapted to substantially inflexibly support cargo thereupon, a lower lamina of a tough, abrasion resistant, flexible, generally planar, sheet-like material adapted for gliding contact with the surface of the floor-like structure, said lamina by its flexibility being adapted to conform to minor irregularities in said surface to thereby have substantially full face to face contact therewith at all times, and an intermediate stratum of aerosol material in which the major portion of the compression is taken by the air in the aerosol, said stratum lying between the upper main support and the lower lamina and transmitting the load of the cargo therebetween, said stratum being only partially compressed by a nominal maximum load of cargo whereby there is under normal load conditions residual compressibility to accommodate inward distortions of the lower lamina in passing over convexities in the surface of the floor-like structure.

6. Cargo handling apparatus adapted to be moved across a floor-like structure on a film of constantly flowing pressurized gaseous medium, comprising: a laminated construction including an upper main support of rigid material adapted to substantially inflexibly support cargo thereupon, a lower lamina of a tough, abrasion resistant, flexible, generally planar, sheet-like material adapted for sliding contact with the surface of the floor-like structure, said lamina by its flexibility being adapted to conform to minor irregularities in said surface to thereby have substantially full face to face contact therewith at all times, and an intermediate stratum of multicellular, foamed, plastic material, said material undergoing compression substantially solely in the air entrapped in its cells, said stratum lying between the upper main support and the lower lamina and transmitting the load of the cargo therebetween, the solid-phase portion of said stratum being only partially compressed by a nominal maximum load of cargo whereby there is under normal load conditions residual compressibility to accommodate inward distortions of the lower lamina in passing over convexities in the surface of the floor-like structure; a plurality of gaseous fluid outlets terminating immediately adjacent the lower lamina at its under surface, said outlets being uniformly spaced whereby when pressurized gas flows through the outlets a moving film of fluid is ejected across substantially the entire lower surface of the lower lamina; and means connecting said outlets with a source of pressurized gaseous fluid.

7. Load handling apparatus adapted to be moved across a floor-like structure on a film of constantly flowing pressurized gaseous medium, comprising: a load, and interposed between the load and the floor-like structure, a stratum of multicellular foamed plastic material in which the main compressive load is taken by the air in the foamed plastic, there being at least one pressurized gaseous fluid outlet terminating in communication with the lower surface of said stratum, whereby under normal loads there is residual compressibility in said stratum to accommodate distortions of said stratum in passing over rugosities in the surface of the floor-like structure and whereby when pressurized gas flows through said outlet a moving film of fluid is ejected across the entire lower surface of said stratum.

*8. Cargo handling apparatus comprising: a main support adapted to have a load placed thereon; a lower lamina of sheet-like generally planar flexible material affixed to said main support and being adapted to directly contact a surface across which the cargo is to be moved; an intermediate lamina of multicellular material being resiliently compressible and dimensionally-recuperative, said material lying immediately adjacent said lower laminate and being interposed between said main support and lower lamina, said intermediate lamina being adapted to locally expand and be compressed upon flexure of the lower lamina when the latter contacts local irregularities in said surface whereby the lower lamina will have substantially full contact with said surface; and outlet means supplying a flow of a pressurized gaseous medium between the lower lamina and the surface, said outlet means being oriented to effect the presence of a film flow of the gaseous fluid across substantially the entire area of the lower lamina whereby the coefficient of friction between the lower lamina and the surface is substantially reduced and the lateral force required to move the load is proportionately reduced.*

*9. Cargo handling apparatus comprising: a main support adapted to have a load placed thereon; a lower lamina of sheet-like generally planar flexible material affixed to said main support and being adapted to directly contact and slide upon a generally planar surface across which the load is to be moved; an intermediate lamina of resiliently compressible material immediately adjacent said lower lamina and being interposed between said main support and lower lamina, said intermediate lamina being adapted to locally expand and be compressed upon flexure of the lower lamina when the latter contacts local irregularities in said surface whereby the lower lamina will have substantially full contact with said surface; at least one outlet in said apparatus and extending through the intermediate and lower laminae and supplying a flow of pressurized gaseous medium between the lower lamina and the surface, said outlet being oriented to effect the distribution of a flow of the gaseous fluid across substantially the entire area of the lower lamina whereby the coefficient of friction between the lower lamina and the surface is substantially reduced and the lateral force required to move the load is proportionately reduced.*

*10. Cargo handling apparatus comprising: a main support adapted to have cargo placed thereon; a lower lamina of sheet-like generally planar flexible material affixed to said main support and being adapted to directly contact a surface across which the cargo is to be moved; an intermediate lamina of resiliently compressible material immediately adjacent said lower lamina and being interposed between said main support and lower lamina, said intermediate lamina being adapted to locally expand and be compressed upon flexure of the lower lamina when the latter contacts local irregularities in said surface whereby the lower lamina will maintain substantially full contact with said surface; outlet means supplying a flow of a pressurized gaseous medium between the lower lamina and the surface, said outlet means being in and at the lower lamina and being oriented to effect the presence of a film flow of the gaseous fluid across substantially the entire area of the lower lamina whereby the coefficient of friction between the lower lamina and the surface is*

*substantially reduced and the lateral force required to move the cargo is proportionately reduced; a gaseous fluid duct means in said apparatus connected to said outlet means; and a quick detachable connection to said fluid duct means for communication with a source of gaseous fluid.*

*11. Cargo handling apparatus adapted to be moved across a floor-like structure on a film of constantly flowing pressurized gaseous medium, comprising: a laminated construction including an upper main support of rigid material adapted to substantially inflexibly support cargo thereupon, a lower lamina of a tough, abrasion resistant, flexible, generally planar, sheet-like material adapted for gliding contact with the surface of the floor-like structure, said lamina by its flexibility being adapted to conform to minor irregularities in said surface to thereby have substantially full face to face contact therewith at all times, and an intermediate stratum of aerosol material in which the major portion of the compression is taken by the air in the aerosol, said stratum lying between the upper main support and the lower lamina and transmitting the load of the cargo therebetween, said stratum being only partially compressed by a normal maximum load of cargo whereby there is under normal load conditions residual compressibility to accommodate inward distortions of the lower lamina in passing over convexities in the surface of the floor-like structure; a source of pressurized gas; and outlet means emitting the gas inwardly of the periphery of the laminated construction and between the lower lamina and the floor-like structure.*

*12. Cargo handling apparatus adapted to be moved across a floor-like structure on a film of constantly flowing pressurized gaseous medium, comprising: a laminated construction including an upper main support of rigid material adapted to substantially inflexibly support cargo thereupon, a lower lamina of a tough, abrasion resistant,*

*flexible, sheet-like material having a generally planar main surface adapted for sliding contact with the surface of the floor-like structure, said lamina by its flexibility being adapted to conform to minor irregularities in said surface to thereby have substantially full face to face contact therewith at all times, and an intermediate stratum of multicellular, foamed, plastic material, said plastic material undergoing compression substantially solely in the air entrapped in its cells, said stratum lying between the upper main support and the lower lamina and transmitting the load of the cargo therebetween, the solid-phase portion of said stratum being only partially compressed by a nominal maximum load of cargo whereby there is under normal load conditions residual compressibility to accommodate inward distortions of the lower lamina in passing over convexities in the surface of the floor-like structure; gaseous fluid outlet means terminating immediately adjacent the lower lamina at its under surface, said outlet means being spaced inwardly from the periphery of the lower lamina whereby when pressurized gas flows through the outlet means a moving film of fluid is ejected across substantially the entire lower surface of the lower lamina; and means connecting said outlet means with a source of pressurized gaseous fluid.*

References Cited in the file of this patent or the original patent

UNITED STATES PATENTS

| | | |
|---|---|---|
| 2,176,307 | Lamb | Oct. 17, 1939 |
| 2,447,285 | Simonton | Aug. 17, 1948 |
| 2,633,982 | Addison | Apr. 7, 1953 |
| 2,938,590 | Barnet | May 31, 1960 |

FOREIGN PATENTS

| | | |
|---|---|---|
| 772,974 | Great Britain | Apr. 17, 1957 |